US012392191B2

(12) United States Patent
Kaneda et al.

(10) Patent No.: US 12,392,191 B2
(45) Date of Patent: Aug. 19, 2025

(54) DOOR OPENING AND CLOSING ASSISTING APPARATUS

(71) Applicant: HONDA MOTOR CO., LTD., Tokyo (JP)

(72) Inventors: Toshihiro Kaneda, Tokyo (JP); Mitsunori Nishino, Tokyo (JP); Nobuyuki Kishikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 18/174,885

(22) Filed: Feb. 27, 2023

(65) Prior Publication Data

US 2023/0287726 A1 Sep. 14, 2023

(30) Foreign Application Priority Data

Mar. 10, 2022 (JP) ................................ 2022-037199

(51) Int. Cl.
*E05F 15/75* (2015.01)
*E05F 15/622* (2015.01)

(52) U.S. Cl.
CPC ............ *E05F 15/75* (2015.01); *E05F 15/622* (2015.01); *E05Y 2400/3015* (2024.05);
(Continued)

(58) Field of Classification Search
CPC ....... E05F 15/75; E05F 15/622; E05F 15/611; E05F 15/70; E05Y 2400/3015;
(Continued)

(56) References Cited

U.S. PATENT DOCUMENTS 5,071,158 A * 12/1991 Yonekawa ........... B60G 17/016 280/5.514
8,539,728 B2 * 9/2013 Simonson ............. E04F 15/225 52/177

(Continued)

FOREIGN PATENT DOCUMENTS

JP 2007-009650 A 1/2007
JP 2007-238014 A 9/2007

(Continued)

OTHER PUBLICATIONS

Japanese Office Action received in corresponding Japanese application No. 2022-037199 dated Nov. 14, 2023 with English translation (10 pages).

*Primary Examiner* — Jean Paul Cass
(74) *Attorney, Agent, or Firm* — Rankin, Hill & Clark LLP

(57) ABSTRACT

A door opening and closing assisting apparatus that assists an opening and closing operation of a door on a vehicle is provided. The door opening and closing assisting apparatus includes: an information obtainer that obtains information on an opening and closing acceleration of the door; a door actuator that performs driving for assisting the opening and closing operation of the door; a target assisting power computer that computes a target assisting power for assisting the opening and closing operation of the door; and a controller that performs driving control for the door actuator based on the target assisting power. The controller starts the driving control for the door actuator at a timing at which the information obtainer obtains the opening and closing acceleration of the door.

4 Claims, 9 Drawing Sheets

(52) U.S. Cl.
CPC ..... *E05Y 2400/326* (2013.01); *E05Y 2400/37* (2024.05); *E05Y 2900/531* (2013.01)

(58) Field of Classification Search
CPC ........... E05Y 2400/326; E05Y 2400/36; E05Y 2900/531; E05Y 2400/32
See application file for complete search history.

(56) References Cited

U.S. PATENT DOCUMENTS

| | | | | |
|---|---|---|---|---|
| 9,846,919 | B2 * | 12/2017 | Kim | G06T 1/20 |
| 10,227,057 | B2 * | 3/2019 | Seyffert | B60R 22/48 |
| 10,442,501 | B2 * | 10/2019 | Calagaz | G06Q 30/0281 |
| 10,772,538 | B1 * | 9/2020 | Elhawary | A61B 5/1118 |
| 11,001,342 | B2 * | 5/2021 | Calagaz | B60R 25/1004 |
| 2017/0081900 | A1 | 3/2017 | Watanabe et al. | |
| 2018/0272845 | A1 * | 9/2018 | Takenaka | E05F 15/41 |
| 2023/0042549 | A1 * | 2/2023 | Tsutsui | E05F 15/659 |

FOREIGN PATENT DOCUMENTS

| | | | | | |
|---|---|---|---|---|---|
| JP | 2011-132686 | A | | 7/2011 | |
| JP | 2012087478 | A | * | 5/2012 | |
| JP | 2015-229868 | A | | 12/2015 | |
| JP | 2022-030622 | A | | 2/2022 | |
| JP | 2023-023078 | A | | 2/2023 | |
| WO | WO-2017029235 | A1 | * | 2/2017 | B60J 5/00 |

* cited by examiner (a) OPENING OPERATION (b) CLOSING OPERATION

FIG. 3D

| | | | OPENING OPERATION | CLOSING OPERATION |
|---|---|---|---|---|
| SLOPE TILTING IN VEHICLE WIDTH DIRECTION | 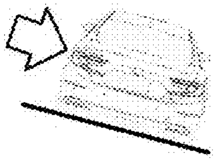 | DOOR POSITIONED UPWARD | MAKE CORRECTION TO MAKE TARGET ASSISTING POWER Ptg LARGER ACCORDING TO LEFT-RIGHT TILT ANGLE AND DOOR OPENNESS DEGREE | MAKE CORRECTION TO MAKE TARGET ASSISTING POWER Ptg SMALLER ACCORDING TO LEFT-RIGHT TILT ANGLE AND DOOR OPENNESS DEGREE |
| | 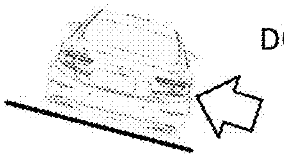 | DOOR POSITIONED DOWNWARD | MAKE CORRECTION TO MAKE TARGET ASSISTING POWER Ptg SMALLER ACCORDING TO LEFT-RIGHT TILT ANGLE AND DOOR OPENNESS DEGREE | MAKE CORRECTION TO MAKE TARGET ASSISTING POWER Ptg LARGER ACCORDING TO LEFT-RIGHT TILT ANGLE AND DOOR OPENNESS DEGREE |
| SLOPE TILTING IN VEHICLE LENGTH DIRECTION |  | FRONT SIDE RISING | MAKE CORRECTION TO MAKE TARGET ASSISTING POWER Ptg LARGER ACCORDING TO FRONT-BACK TILT ANGLE AND DOOR OPENNESS DEGREE | MAKE CORRECTION TO MAKE TARGET ASSISTING POWER Ptg SMALLER ACCORDING TO FRONT-BACK TILT ANGLE AND DOOR OPENNESS DEGREE |
| | 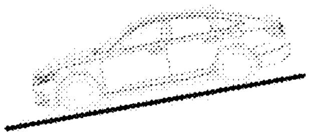 | FRONT SIDE SINKING | MAKE CORRECTION TO MAKE TARGET ASSISTING POWER Ptg SMALLER ACCORDING TO FRONT-BACK TILT ANGLE AND DOOR OPENNESS DEGREE | MAKE CORRECTION TO MAKE TARGET ASSISTING POWER Ptg LARGER ACCORDING TO FRONT-BACK TILT ANGLE AND DOOR OPENNESS DEGREE |

DOOR OPENING AND CLOSING ASSISTING APPARATUS

CROSS-REFERENCE TO RELATED APPLICATION

This application claims the benefit of foreign priority to Japanese Patent Application No. 2022-037199, filed on Mar. 10, 2022, which is incorporated by reference in its entirety.

TECHNICAL FIELD

The present invention relates to a door opening and closing assisting apparatus that assists in opening and closing of a door on a vehicle.

BACKGROUND

There is conventionally known a door opening and closing assisting apparatus that assists in opening and closing of a door by applying an assisting power to a door opening and closing operation power exerted by an operator of a vehicle (see JP2007-238014A). The door opening and closing assisting apparatus according to JP2007-238014A includes a torque sensor that detects a door opening and closing operation power exerted to a door knob on a vehicle, a velocity sensor that detects the velocity of opening and closing of the door, a motor that assists the door opening and closing operation power, and a controller that controls the motor using an assisting power instruction value computed from the door opening and closing operation power and the opening and closing velocity. The controller computes the assisting power instruction value based on the mass of the door, a viscous friction coefficient determined by the relation between a viscous friction force acting on the door and a moving velocity, and a virtual mass and a virtual viscosity friction coefficient for attaining ideal operability.

The door opening and closing assisting apparatus according to JP2007-238014A computes the assisting power instruction value based on the opening and closing operation power and opening and closing velocity of the door and controls the motor based on the assisting power instruction value obtained as a result of the computation. Thus, the control logic is established with a small number of parameters, and therefore, setting, development, and the like can be done readily with a clear configuration.

Meanwhile, in order for a door opening and closing assisting apparatus like the one disclosed in JP2007-238014A to be used widely, not only favorable operability for opening and closing the door, but also simplicity of the configuration of the apparatus is demanded.

In this regard, the door opening and closing assisting apparatus according to JP2007-238014A has room for improvement in terms of achieving favorable operability for opening and closing a door with a simple apparatus configuration.

The present invention has been made to solve the above problem and has an object to provide a door opening and closing assisting apparatus capable of achieving favorable operability for door opening and closing with a simple apparatus configuration.

SUMMARY

To achieve the above object, one aspect of the present invention is mainly characterized as a door opening and closing assisting apparatus that assists an opening and closing operation of a door on a vehicle, the door opening and closing assisting apparatus including: an information obtainer that obtains information on an opening and closing acceleration of the door; a door actuator that performs driving for assisting the opening and closing operation of the door; a target assisting power computer that computes a target assisting power for assisting the opening and closing operation of the door; and a controller that performs driving control for the door actuator based on the target assisting power, in which the controller starts the driving control for the door actuator at a timing at which the information obtainer obtains the opening and closing acceleration of the door.

BRIEF DESCRIPTION OF THE DRAWINGS

The drawings described herein are for illustration purposes only and are not intended to limit the scope of the present invention in any way.

FIG. 3D is a diagram conceptually showing suitable increase or decrease corrections made on a standard assisting power for various attitudes of a vehicle in each of a door opening operation and a door closing operation.

DETAILED DESCRIPTION

Figure 1A:
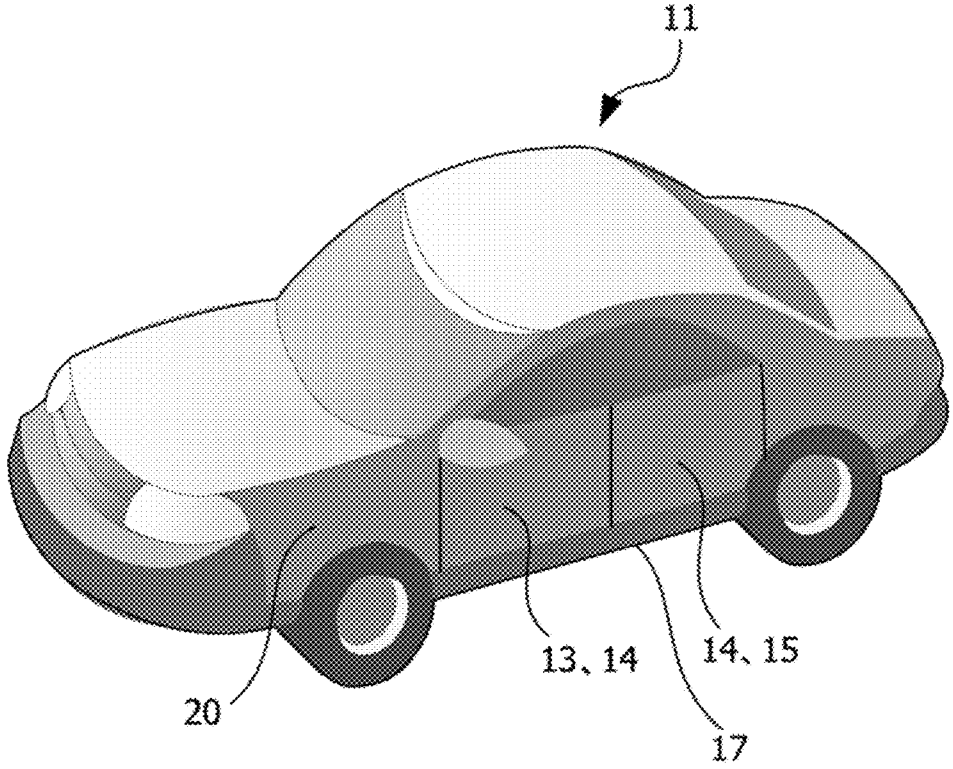
FIG. 1A is a perspective view of an outer appearance of a vehicle equipped with a door opening and closing assisting apparatus according to an embodiment of the present invention.

Referring to the drawings as needed, the following provides a detailed description of a door opening and closing assisting apparatus according to an embodiment of the present invention.

Note that throughout the drawings to be referred to below, members having the same function are denoted by the same reference sign. Also, the size and shape of a member may be schematically shown and may be modified or exaggerated for explanatory convenience.

When a description is given using directions, the directions are based on the front and rear, left and right, and up and down as seen from a driver sitting in the driver's seat (the front right seat) unless otherwise noted. In other words, a "front-back direction" corresponds to a "vehicle length direction," a "left and right direction" corresponds to a "vehicle width direction," and an "up-down direction" corresponds to a "vehicle height direction."

In the description of a vehicle 11 equipped with a door opening and closing assisting apparatus 10 according to the embodiment of the present invention, a plurality of members forming the vehicle body of the vehicle 11 are formed using a metal material such as a steel plate, unless otherwise noted.

[Configuration of Door Opening and Closing Assisting Apparatus 10]

First, the configuration of the vehicle 11 equipped with the door opening and closing assisting apparatus 10 according to the embodiment of the present invention is described with reference to FIGS. 1A and 1B as needed.

Figure 2:
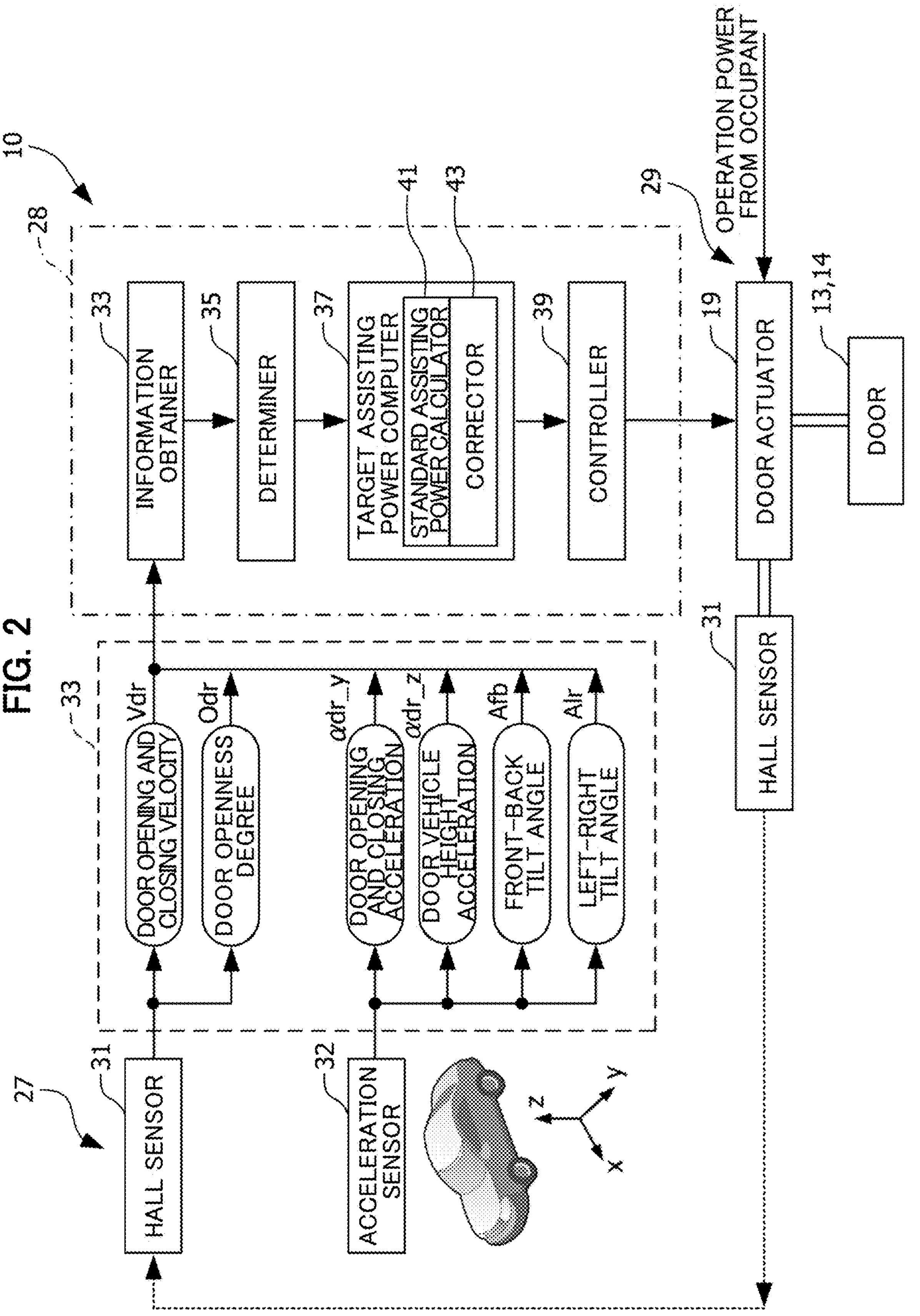
FIG. 2 is a functional block configuration diagram of the door opening and closing assisting apparatus according to the embodiment of the present invention.
Figure 3A:
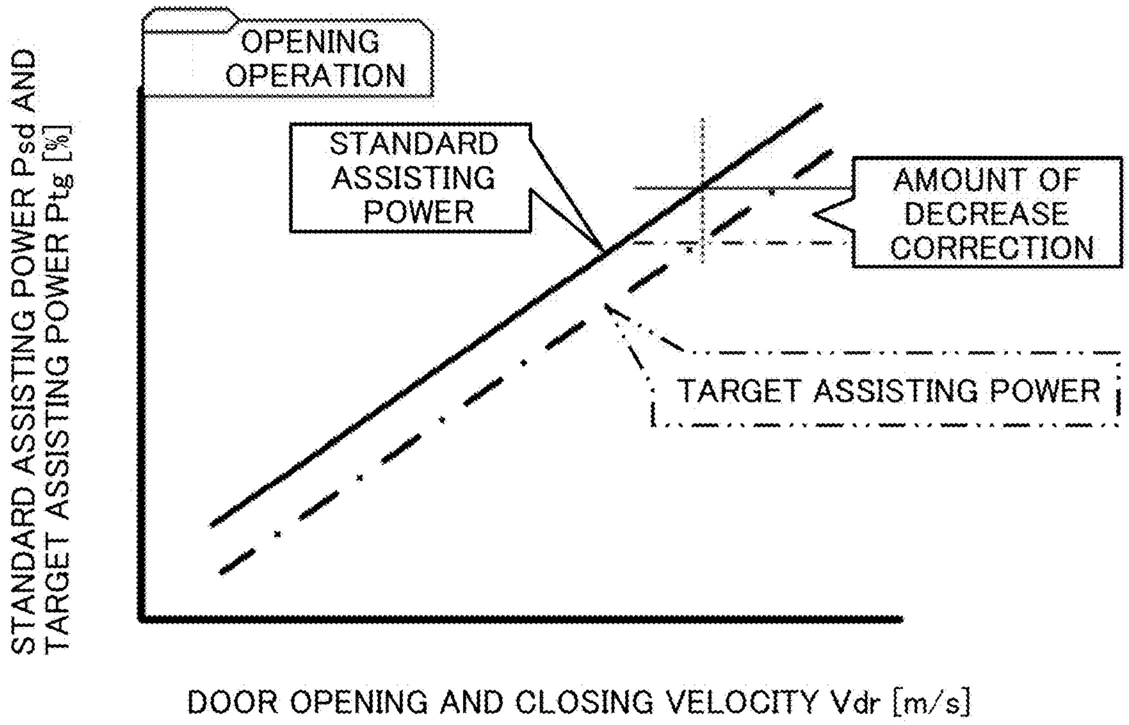
FIG. 3A includes a diagram (a) conceptually showing, in contradistinction, the relation between a standard assisting power and a target assisting power in a door opening operation with the door opening and closing velocity being changed and a diagram (b) conceptually showing, in contradistinction, the relation between the standard assisting power and the target assisting power in a door closing operation with the door opening and closing velocity being changed.
Figure 3A:
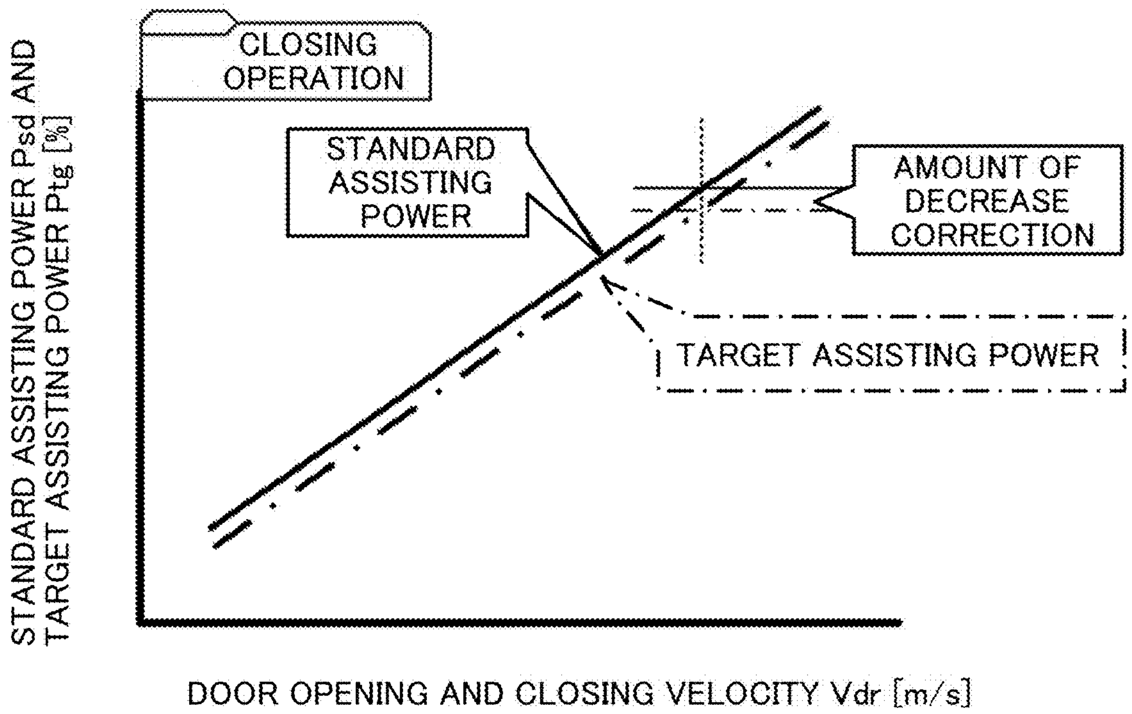
Figure 3B:
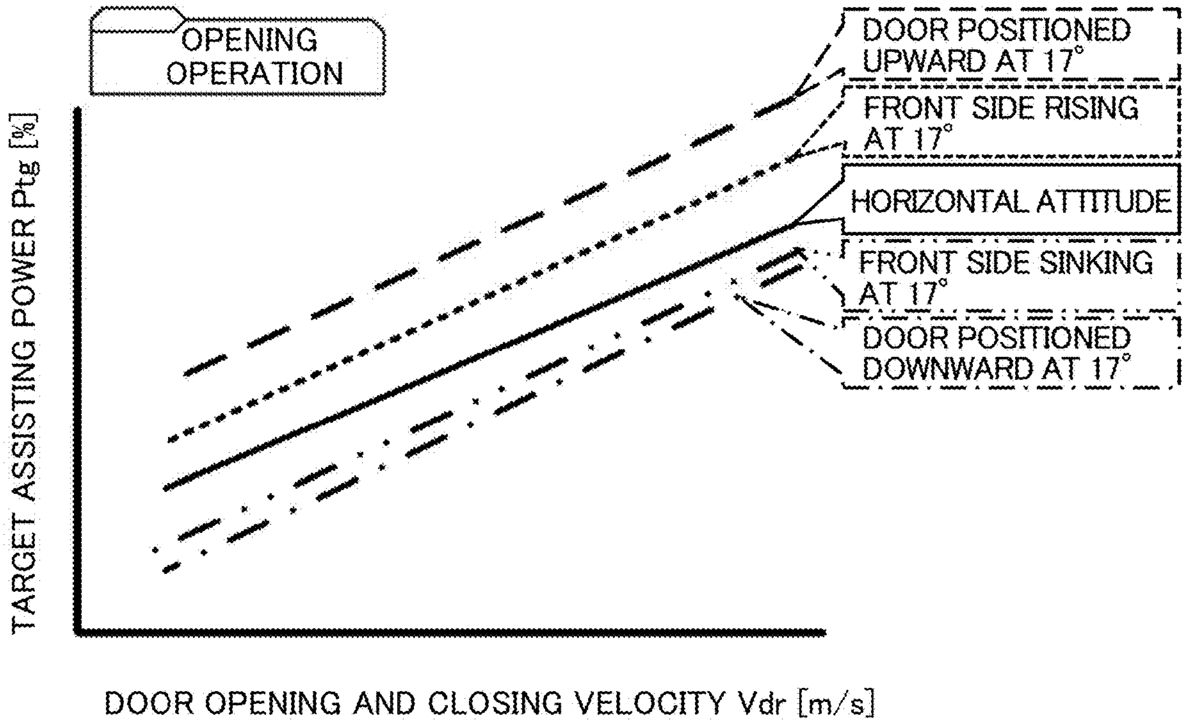
FIG. 3B is a diagram conceptually showing, in contradistinction, the relation of the target assisting power to the opening and closing velocity of the door for each of variously changed attitudes of the vehicle in a door opening operation.
Figure 3C:
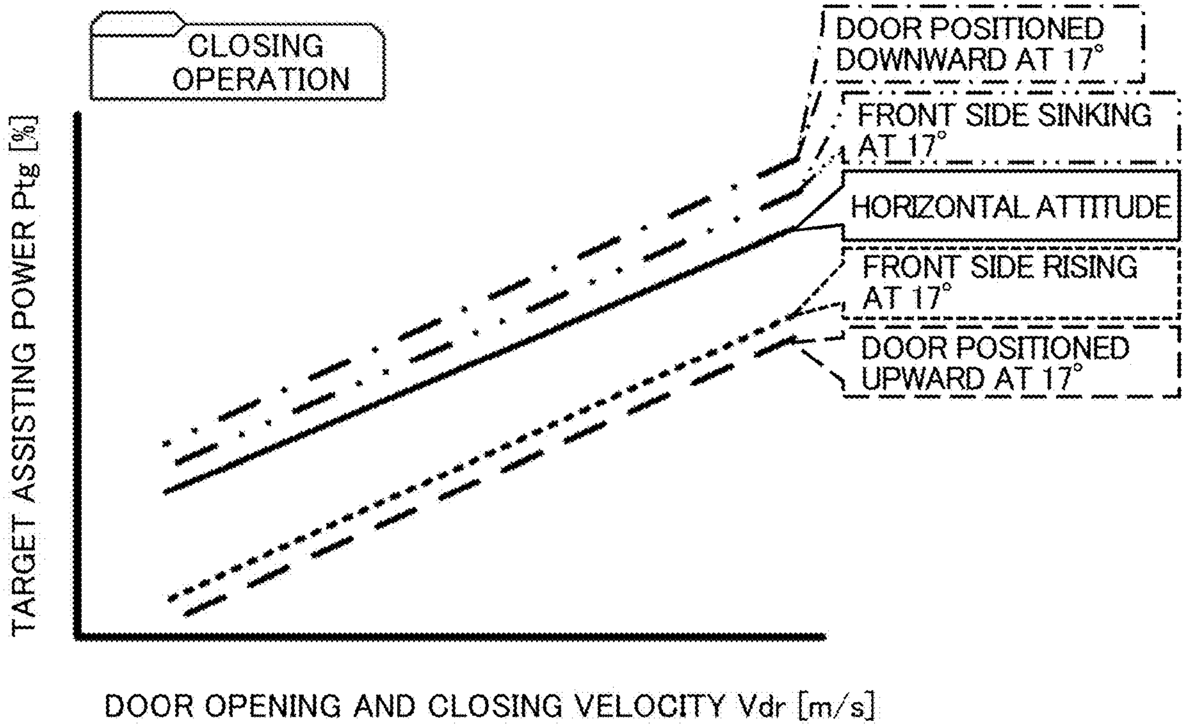
FIG. 3C is a diagram conceptually showing, in contradistinction, the relation of the target assisting power to the opening and closing velocity of the door for each of variously changed attitudes of the vehicle in a door closing operation.

FIG. 1A is a perspective view of an outer appearance of the vehicle 11 equipped with the door opening and closing assisting apparatus 10 according to the embodiment of the present invention. FIG. 1B is a perspective view showing how the door opening and closing assisting apparatus 10 is attached to a door 13. FIG. 2 is a functional block configuration diagram of the door opening and closing assisting apparatus 10. In FIG. 3A, (a) is a diagram conceptually showing, in contradistinction, the relation between a standard assisting power Psd and a target assisting power Ptg in a door opening operation with the door opening and closing velocity being changed, and (b) is a diagram conceptually showing, in contradistinction, the relation between the standard assisting power Psd and the target assisting power Ptg in a door closing operation with the door opening and closing velocity being changed. FIG. 3B is a diagram conceptually showing, in contradistinction, the relation of the target assisting power Ptg to an opening and closing velocity Vdr of a door 14 for each of variously changed attitudes of the vehicle 11 in an opening operation of the door 14. FIG. 3C is a diagram conceptually showing, in contradistinction, the relation of the target assisting power Ptg to the opening and closing velocity Vdr of the door 14 for each of variously changed attitudes of the vehicle 11 in a closing operation of the door 14. FIG. 3D is a diagram conceptually showing suitable increase or decrease corrections made on the standard assisting power Psd for various attitudes of a vehicle 11 in each of door opening and closing operations of the door 14.

As shown in FIG. 1A, the vehicle 11 equipped with the door opening and closing assisting apparatus 10 according to the embodiment of the present invention includes, on its sides, left and right front seat doors 13, left and right rear seat doors 15, and left and right side sills 17. Note that the front seat doors 13 and the rear seat doors 15 are collectively called "doors 14" in the following description unless a distinction therebetween is necessary.

Figure 1B:
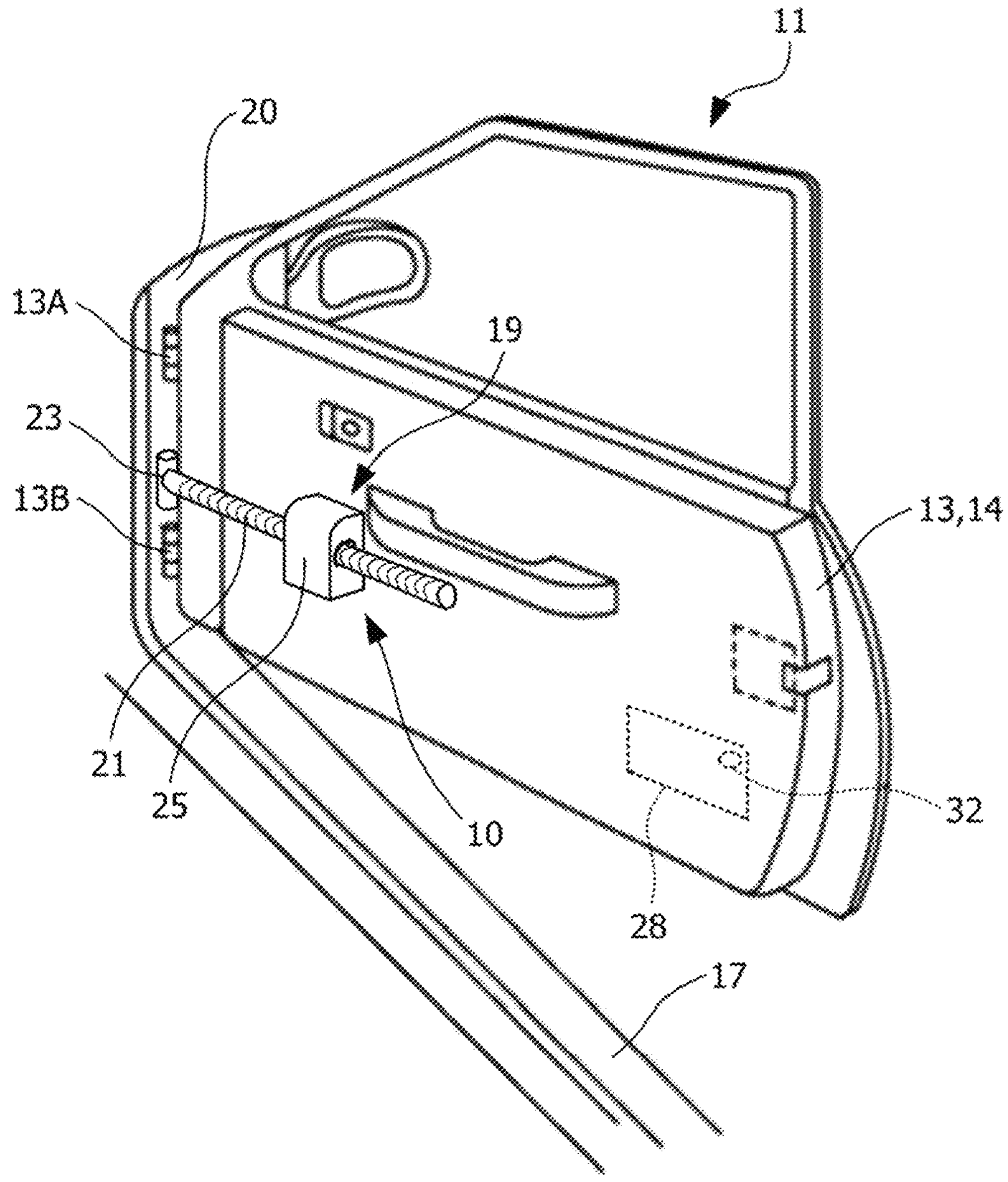
FIG. 1B is a perspective view showing how the door opening and closing assisting apparatus is attached to a door.

As shown in FIG. 1B, the front seat doors 13 (the doors 14) are each swingably attached to a vehicle body 20 via a pair of hinge mechanisms 13A and 13B arranged in the vehicle height direction, so that the front seat door 13 is freely openable and closable. The doors 14 are each provided with a door actuator 19 of the door opening and closing assisting apparatus 10, the door actuator 19 performing driving for assisting an opening and closing operation of the door 14.

As shown in FIG. 1B, the door actuator 19 is configured including a spindle screw 21 having a screw groove axially formed in its outer circumference and a door motor 25 having a spindle nut (not shown) having a screw groove formed in its inner circumference to threadably engage with the screw groove on the spindle screw 21, the spindle nut being connected to a rotor (not shown) via a speed reduction mechanism (not shown).

One end of the spindle screw 21 is pivotally supported via a joint mechanism 23 provided on the vehicle body 20. The other end of the spindle screw 21 is provided with the door motor 25. The door motor 25 is fixedly provided on the inner side of the front seat door 13 (the door 14).

In the door opening and closing assisting apparatus 10 according to the embodiment of the present invention, when an operator performs an operation for opening and closing the door 14, the door actuator 19 starts driving, triggered by the opening or closing movement of the door 14 caused by the opening or closing operation.

For instance, in a case where an operator performs an operation for opening the door 14, the door 14 undergoes opening movement caused by the opening operation.

In response to the opening movement of the door 14, the rotor of the door motor 25 provided at the free end of the spindle screw 21 is mechanically driven and rotated. When no electric power is being fed to the door motor 25, the door motor 25 serves to hinder the opening movement of the door 14 as a power generation device. In this state, the operator experiences a resistance against the opening or closing operation of the door 14 and is therefore unable to have favorable operability for opening or closing the door 14.

Thus, when the door 14 is opened, a door ECU 28 provided at the front seat door 13 (the door 14) determines whether a condition to start driving of the door actuator 19 (to be detailed later) is satisfied. Driving of the door actuator 19 is started if it is determined that the condition to start driving of the door actuator 19 is satisfied.

Once driving of the door actuator 19 is started, the door motor 25 is supplied with electric power so that the opening movement of the door 14 may be performed. Assisting power enabled by this power supply is added to the operation power of the operator. This reduces resistance that the operator feels when performing an operation for opening and closing the door 14, providing them with favorable operability for opening and closing the door 14.

When the condition to start driving of the door actuator 19 is satisfied, the door opening and closing assisting apparatus 10 according to the embodiment of the present invention calculates, based on the opening and closing velocity Vdr of the door 14, the standard assisting power Psd which is assisting power required to maintain the opening and closing velocity Vdr, and corrects the calculated standard assisting power Psd in order to improve the operability for opening or closing the door 14 and to have favorable operability comparable to that in a case where the vehicle 11 has a horizontal attitude.

More specifically, when the attitude of the vehicle 11 (including tilts in the front-back direction and the left-right direction) is horizontal, the door opening and closing assisting apparatus 10 makes the correction by decreasing the calculated standard assisting power Psd based on a predetermined rule and sets the standard assisting power Psd thus corrected by being decreased as a target assisting power Ptg.

Meanwhile, when the attitude of the vehicle 11 is not horizontal, the door opening and closing assisting apparatus 10 makes the correction by increasing or decreasing the calculated standard assisting power Psd according to the attitude of the vehicle and the openness degree Odr of the door 14 so as to be able to attain favorable operability comparable to that in a case where the vehicle 11 has a horizontal attitude, and sets the standard assisting power Psd thus corrected by being increased or decreased as the target assisting power Ptg.

Favorable operability for opening and closing the door 14 can thereby be achieved with a simple apparatus configuration. Details of this will be described sequentially.

To implement the functions described above, the door opening and closing assisting apparatus 10 according to the embodiment of the present invention is configured including, as shown in FIG. 2, functional units belonging to each of an input system 27, an information processing system (door ECU) 28, and an output system 29.

The functional units belonging to the input system 27 are configured including a Hall sensor 31 and an acceleration sensor 32.

The Hall sensor 31 outputs detection signals including chronological information on the rotation position and rotation velocity of the rotor of the door motor 25 belonging to the door actuator 19.

Output signals from the Hall sensor 31 are sequentially sent to an information obtainer 33 belonging to the door ECU 28. The Hall sensor 31 corresponds to the "openness degree sensor" of the present invention.

The acceleration sensor 32 outputs a detection signal indicative of a roll angle, a detection signal indicative of a pitch angle, and a detection signal indicating of a yaw angle. When the front-back direction, the left-right direction (the vehicle width direction), and the up-down direction (the vehicle height direction) of the horizontal and stationary vehicle 11 are an x-axis direction, a y-axis direction, and a z-axis direction, respectively, the roll angle is a rotation angle about the x-axis as a rotary axis, the pitch angle is a rotation angle about the y-axis as a rotary axis, and the yaw angle is a rotational angle about the z-axis as a rotary axis.

As shown in FIG. 1B, the acceleration sensor 32 is mounted on a board (not shown) of the door ECU 28.

The output signals (a roll angle, a pitch angle, and a yaw angle) from the acceleration sensor 32 are sequentially sent to the information obtainer 33 belonging to the door ECU 28.

Functional units belonging to the information processing system (door ECU) 28 are configured including the information obtainer 33, a determiner 35, a target assisting power computer 37, and a controller 39.

The information obtainer 33 converts the output signals sent from the Hall sensor 31 into chronological information on the opening and closing velocity Vdr and the openness degree Odr of the door 14.

The information obtainer 33 also converts the output signals (a roll angle, a pitch angle, and a yaw angle) sent from the acceleration sensor 32 into chronological information on a front-back tilt angle Afb and a left-right tilt angle Alr.

The information obtainer 33 further converts each of the output signals (a roll angle, a pitch angle, and a yaw angle) sent from the acceleration sensor 32 into chronological information on an opening and closing acceleration $\alpha dr\_y$ and a vehicle height acceleration $\alpha dr\_z$ of the door 14.

The information obtainer 33 thereby obtains the chronological information on the opening and closing velocity Vdr and the openness degree Odr of the door 14 based on the output signals sent from the Hall sensor 31 as well as the chronological information on the front-back tilt angle Afb and the left-right tilt angle Alr and the chronological information on the opening and closing acceleration $\alpha dr\_y$ and the vehicle height acceleration $\alpha dr\_z$ of the door 14 based on the output signals from the acceleration sensor 32.

Note that as the openness degree Odr of the door 14, the current position of the door 14 in a relative coordinate system can be expressed by, for example, setting a definition range by allocating a numeric value "0" to a fully closed (closed) state and a numeric value "100" to a fully opened state (a state where the door is opened to the utmost limit) and assigning appropriate numeric values 1 to 99 to the current open/close positions.

As the front-back tilt angle Afb, the attitude (tilt angle) of the vehicle 11 in the front-back direction in a relative coordinate system can be expressed by, for example, assigning a numeric value "0" to the horizontal state, a positive numeric value to a frontward tilting state, and a negative numeric value to a rearward tilting state.

Similarly, as the left-right tilt angle Alr, the attitude (tilt angle) of the vehicle 11 in the left-right direction in a relative coordinate system can be expressed by, for example, assigning a numeric value "0" to the horizontal state, a positive numeric value to a leftward tilting state, and a negative numeric value to a rightward tilting state.

The opening and closing acceleration $\alpha dr\_y$ of the door 14 is an acceleration acting in the left-right direction (the vehicle width direction: the y-axis direction) of the door 14.

Also, the vehicle height acceleration $\alpha dr\_z$ of the door 14 is an acceleration acting in the up-down direction (the vehicle height direction: the z-axis direction) of the door 14.

The chronological information obtained by the information obtainer 33, namely the chronological information on the opening and closing velocity Vdr and the openness degree Odr of the door 14, the chronological information on the front-back tilt angle Afb and the left-right tilt angle Alr, and the chronological information on the opening and closing acceleration $\alpha dr\_y$ and the vehicle height acceleration $\alpha dr\_z$ of the door 14, are sent to the determiner 35.

The determiner 35 not only determines the direction of the opening and closing operation of the door 14, but also determines whether the opening and closing acceleration $\alpha dr\_y$ of the door 14 is above a predetermined opening and closing acceleration threshold $\alpha dr\_yth$, whether the vehicle height acceleration $\alpha dr\_z$ of the door 14 is below a predetermined vehicle height acceleration threshold $\alpha dr\_zth$, and whether the opening and closing velocity Vdr of the door 14 is below a predetermined velocity threshold Vdrth.

Of the items determined by the determiner 35, "whether the vehicle height acceleration $\alpha dr\_z$ of the door 14 is below the predetermined vehicle height acceleration threshold $\alpha dr\_zth$" may be omitted.

The direction of the opening and closing operation of the door 14 may be obtained based on whether the sign of the difference between the openness degrees Odr that are a certain temporal interval apart from each other in the chronological information on the openness degree Odr of the door 14 is positive or negative.

The determination result on the direction of the opening and closing operation of the door 14 obtained by the determiner 35 is sent to the target assisting power computer 37.

Also, the acceleration-related determination results obtained by the determiner 35, namely whether the opening and closing acceleration $\alpha dr\_y$ of the door 14 is above the predetermined opening and closing acceleration threshold αdr_yth and whether the vehicle height acceleration αdr_z of the door 14 is below the predetermined vehicle height acceleration threshold αdr_zth, are sent to the controller 39.

If the opening and closing acceleration αdr_y of the door 14 is not above the predetermined opening and closing acceleration threshold αdr_yth or the vehicle height acceleration αdr_z of the door 14 is equal to or above the predetermined vehicle height acceleration threshold αdr_zth, it is highly probable that the values of the opening and closing acceleration αdr_y of the door 14 and the vehicle height acceleration αdr_z of the door 14 are a result of error detection. If driving of the door actuator 19 is started in such a case, the operator may experience a strange feeling as if the door 14 is moving against their will.

Thus, in the door opening and closing assisting apparatus 10 according to the embodiment of the present invention, driving of the door actuator 19 is started only when acceleration requirements are satisfied, the acceleration requirements being the opening and closing acceleration αdr_y of the door 14 being above the predetermined opening and closing acceleration threshold αdr_yth and the vehicle height acceleration αdr_z of the door 14 being below the predetermined vehicle height acceleration threshold αdr_zth.

A situation where the operator may experience a strange feeling as if the door 14 is moving against their will is thereby avoided.

Thus, values set as the predetermined opening and closing acceleration threshold αdr_yth and the predetermined vehicle height acceleration threshold αdr_zth may be any appropriate values (except for zero) indicating that the values of the opening and closing acceleration αdr_y of the door 14 and the vehicle height acceleration αdr_z of the door 14 are not a result of error detection.

In addition, the determination result obtained by the determiner 35 regarding whether the opening and closing velocity Vdr of the door 14 is below the predetermined velocity threshold Vdrth is sent to the controller 39.

If, during the driving of the door actuator 19, assisting power from the door actuator 19 continues to be applied until the opening and closing velocity Vdr of the door 14 becomes zero, the operator may experience a strange feeling as if the door 14 is coasting against their will.

Thus, in the door opening and closing assisting apparatus 10 according to the embodiment of the present invention, driving control of the door actuator 19 is stopped at a timing at which the opening and closing operation of the door 14 is expected to end soon, such as when the opening and closing velocity Vdr of the door 14 falls below the predetermined velocity threshold Vdrth.

A situation where the operator may experience a strange feeling as if the door 14 is coasting against their will is thereby avoided.

Thus, as the predetermined velocity threshold Vdrth, for example, a value of the opening and closing velocity Vdr of the door 14 (except for zero) indicating that the opening and closing movement of the door 14 is expected to end soon may be appropriately set.

The determiner 35 also determines whether the front-back tilt angle Afb of the vehicle 11 is above a predetermined front-back tilt angle threshold Afbth and whether the left-right tilt angle Alr of the vehicle 11 is above a predetermined left-right tilt angle threshold Alrth.

The determination results obtained by the determiner 35 on whether the front-back tilt angle Afb of the vehicle 11 is above the predetermined front-back tilt angle threshold Afbth and whether the left-right tilt angle Alr of the vehicle 11 is above the predetermined left-right tilt angle threshold Alrth are sent to the target assisting power computer 37.

Note that the determiner 35 may be configured to determine that the opening and closing velocity Vdr of the door 14 is below the predetermined velocity threshold Vdrth when the opening and closing velocity Vdr of the door 14 stays below the predetermined velocity threshold Vdrth for a predetermine period of time.

This configuration is expected to offer an effect of avoiding a situation where driving control of the door actuator 19 is erroneously stopped precociously by mistiming the end of the opening or closing movement of the door 14.

The target assisting power computer 37 computes the target assisting power Ptg for assisting an opening or closing operation of the door 14.

To be more specific, the target assisting power computer 37 is configured including a standard assisting power calculator 41 that calculates the standard assisting power Psd based on the opening and closing velocity Vdr of the door 14 obtained by the information obtainer 33, the standard assisting power Psd being assisting power required to maintain the opening and closing velocity Vdr; and a corrector 43 that corrects the standard assisting power Psd calculated by the standard assisting power calculator 41 in order to improve the operability for opening and closing the door 14 and to attain favorable operability comparable to that in a case where the vehicle 11 has a horizontal attitude even if the vehicle 11 does not have a horizontal attitude.

The standard assisting power calculator 41 of the target assisting power computer 37 calculates the standard assisting power Psd based on the opening and closing velocity Vdr of the door 14 obtained by the information obtainer 33, the standard assisting power Psd being assisting power required to maintain the opening and closing velocity Vdr.

The corrector 43 of the target assisting power computer 37 performs correction processing on the standard assisting power Psd calculated by the standard assisting power calculator 41, the correction processing being different depending on whether the vehicle 11 has a horizontal attitude or does not have a horizontal attitude (the vehicle 11 is tilted in the front-back and/or left-right direction).

Specifically, when the attitude of the vehicle 11 (including tilts in the front-back and left-right directions) is horizontal, the corrector 43 of the target assisting power computer 37 makes the correction by decreasing the standard assisting power Psd calculated by the standard assisting power calculator 41 based on a predetermined rule and sets the standard assisting power Psd thus corrected by being decreased as a target assisting power Ptg.

In this way, in a case of performing driving control of the door actuator 19 when the vehicle 11 has a horizontal attitude, the standard assisting power Psd thus corrected by being decreased is set as the target assisting power Ptg. Thus, compared to a case where the target assisting power Ptg is a standard assisting power Psd without the decrease correction, assisting power is applied so that the door 14 moves to follow the opening and closing operation performed by the operator with a delay.

As a result, the operator's power of opening and closing the door 14 can be assisted properly, not too much or too little, and thus, the operability for opening and closing the door 14 can be improved.

Meanwhile, when the vehicle 11 does not have a horizontal attitude (when the vehicle 11 is tilting in the front-back or left-right direction), the corrector 43 of the target assisting power computer 37 makes the correction by increasing or decreasing the standard assisting power Psd calculated by the standard assisting power calculator 41 based on the attitude of the vehicle 11 and the openness degree Odr of the door 14 (details will be described later) so as to offer favorable operability comparable to that in a case where the vehicle 11 has a horizontal attitude, and sets the standard assisting power Psd thus corrected by being increased or decreased as the target assisting power Ptg.

In this case, in a case of performing driving control of the door actuator 19 when the vehicle 11 does not have a horizontal attitude, the standard assisting power Psd calculated by the standard assisting power calculator 41 is corrected by being increased or decreased based on the attitude of the vehicle 11 and the openness degree Odr of the door 14, and the standard assisting power Psd thus corrected by being increased or decreased is set as the target assisting power Ptg. Thus, even if the magnitude of gravity acting on the door 14 changes depending on the attitude of the vehicle 11 and the openness degree Odr of the door 14, assisting power applied can be of a magnitude that eliminates the affect by this change, compared to a case where the target assisting power Ptg is not a standard assisting power Psd corrected by being increased or decreased based on the attitude of the vehicle 11 and the openness degree Odr of the door 14.

As a result, the operator's operation power for opening and closing the door 14 can be properly assisted not too much or not too little, and thus, the operability for opening and closing the door 14 can be improved.

The target assisting power Ptg which is the computation result obtained by the target assisting power computer 37 is sent to the controller 39.

Here, the correction by decreasing the standard assisting power Psd based on the predetermined rule is, for example, a concept including both of a mode of obtaining the target assisting power Ptg which is decreased by multiplication of the standard assisting power Psd by a predetermined decrease rate (e.g., approximately 3% to 20%) and a mode of obtaining the target assisting power Ptg which is decreased by subtraction of a predetermined value (e.g., a value corresponding to approximately 3% to 20%) from the standard assisting power Psd.

Note that there are no particular limitations for the standard assisting power Psd and the target assisting power Ptg, but for example, they can be obtained using a mode involving an output duty ratio [%].

Also, as shown in, for example, (a) and (b) of FIG. 3A in contradistinction, the corrector 43 belonging to the target assisting power computer 37 makes a correction so that the amount of the decrease correction may be smaller for a closing operation of the door 14 than for an opening operation of the door 14.

Thus, a situation where the door 14 hits the next vehicle in the opening operation of the door 14 is less likely to occur, and an experience of speedy closing of the door 14 can be offered in the closing operation of the door 14.

The corrector 43 belonging to the target assisting power computer 37 further makes a correction by increasing or decreasing the standard assisting power Psd based on the information on the attitude of the vehicle 11 including front-back and left-right tilts.

To be more specific, as shown in FIGS. 3B and 3D, in a case where a force that hinders the open state of the door 14 is exerted in the opening operation of the door 14 due to a change in the attitude of the vehicle 11 (the door positioned upward at 17 degrees; the front side rising at 17 degrees), a correction is made so that the target assisting power Ptg may be larger than in a case where the vehicle 11 has a horizontal attitude. This correction is made by increasing the amount of correction on the standard assisting power Psd compared to that in a case where the vehicle 11 has a horizontal attitude.

Note that "the door positioned upward at 17 degrees" means that the target is a door located at an upper side when the vehicle 11 is on a slope tilting in the vehicle width direction (at a tilt angle of 17°).

Meanwhile, "the front side rising at 17 degrees" means that the target is a door on the vehicle 11 being on a slope tilting in the vehicle length direction (at a tilt angle of 17°) in such a manner that the front of the vehicle 11 is directed upward.

By contrast, in a case where a force that promotes the open state of the door 14 is exerted in the opening operation of the door 14 due to a change in the attitude of the vehicle 11 (the door positioned downward at 17 degrees; the front side sinking at 17 degrees), a correction is made so that the target assisting power Ptg may be smaller than in a case where the vehicle 11 has a horizontal attitude. This correction is made by decreasing the amount of correction on the standard assisting power Psd compared to that in a case where the vehicle 11 has a horizontal attitude.

Note that "the door positioned downward at 17 degrees" means that the target is a door located at a lower side when the vehicle 11 is on a slope tilting in the vehicle width direction (at a tilt angle of 17°).

Meanwhile, "the front side sinking at 17 degrees" means that the target is a door on the vehicle 11 being on a slope tilting in the vehicle length direction (at a tilt angle of 17°) in such a manner that the front of the vehicle 11 is directed downward.

Also, as shown in FIGS. 3C and 3D, in a case where a force that hinders the closed state of the door 14 is exerted in the closing operation of the door 14 due to a change in the attitude of the vehicle 11 (the door positioned downward at 17 degrees; the front side sinking at 17 degrees), a correction is made so that the target assisting power Ptg may be larger than in a case where the vehicle 11 has a horizontal attitude. This correction is made by increasing the amount of correction on the standard assisting power Psd compared to that in a case where the vehicle 11 has a horizontal attitude.

By contrast, in a case where a force that promotes the closed state of the door 14 is exerted in the closing operation of the door 14 due to a change in the attitude of the vehicle 11 (the door positioned upward at 17 degrees; the front side rising at 17 degrees), a correction is made so that the target assisting power Ptg may be smaller than in a case where the vehicle 11 has a horizontal attitude. This correction is made by decreasing the amount of correction on the standard assisting power Psd compared to that in a case where the vehicle 11 has a horizontal attitude.

Note that the correction for making the target assisting power Ptg larger or smaller due to a change in the attitude of the vehicle 11 may be made using a combined correction amount obtained by adding and combining a correction amount for the front-back tilt angle Afb and a correction amount for the left-right tilt angle Alr that have been independently obtained.

For the correction made by increasing or decreasing the standard assisting power Psd, in actuality, characteristics tables (or conversion formulae) for the target assisting power Ptg that changes according to a change in the opening and closing velocity Vdr of the door 14 are prepared in advance according to operation modes (opening and closing) of the door 14 and according to changes in the attitude of the vehicle 11. The characteristics tables (conversion formulae) to be referred to are switched and used for each individual case (such as, for example, the door 14 is being operated to be open, the door 14 is positioned upward, and the vehicle 11 has a front rising attitude).

Favorable operability for opening and closing the door 14 is thus achieved with a simple apparatus configuration.

Because the corrector 43 belonging to the target assisting power computer 37 thus makes a correction by increasing or decreasing the standard assisting power Psd based on information on the attitude of the vehicle 11 including front-back and left-right tilts, driving control of the door actuator 19 is performed using the target assisting power Ptg of a magnitude suited to the change in the attitude of the vehicle 11. As a result, even if the attitude of the vehicle 11 changes, favorable operability for opening and closing the door 14 can be achieved with a simple apparatus configuration.

When there is a change in the attitude of the vehicle 11 including front-back and left-right tilts, the magnitude of gravity acting on the door 14 changes depending on whether the openness degree Odr of the door 14 is large or small. In other words, there is a close relation between the openness degree Odr of the door 14 and the operability for opening and closing the door 14.

Thus, the corrector 43 belonging to the target assisting power computer 37 makes a correction by increasing or decreasing the standard assisting power Psd based on information on the attitude of the vehicle 11 including front-back and left-right tilts and on the openness degree Odr of the door 14.

To be more specific, as shown in FIGS. 3B and 3D, in a case where a force that hinders the open state of the door 14 is exerted in the opening operation of the door 14 due to a change in the attitude of the vehicle 11 (the door positioned upward at 17 degrees; the front side rising at 17 degrees), a correction is made so that the target assisting power Ptg may be larger than in a case where the vehicle 11 has a horizontal attitude. This correction is made by increasing the amount of correction on the standard assisting power Psd compared to that in a case where the vehicle 11 has a horizontal attitude.

Specifically, the amount of correction made here on the standard assisting power Psd can be expressed as follows: [(the front-back tilt angle Afb*a tilt coefficient β)*the door openness degree Odr]. The larger the front-back tilt angle Afb and the larger the door openness degree Odr, the larger the above correction amount. Here, (the front-back tilt angle Afb*the tilt coefficient β) means an output (a duty ratio) necessary at the time of starting actuation of the door 14 (this is true hereinbelow as well).

By contrast, in a case where a force that promotes the open state of the door 14 is exerted in the opening operation of the door 14 due to a change in the attitude of the vehicle 11 (the door positioned downward at 17 degrees; the front side sinking at 17 degrees), a correction is made so that the target assisting power Ptg may be smaller than in a case where the vehicle 11 has a horizontal attitude. This correction is made by decreasing the amount of correction on the standard assisting power Psd compared to that in a case where the vehicle 11 has a horizontal attitude.

Specifically, the amount of correction made here on the standard assisting power Psd can be expressed as follows: [(the front-back tilt angle Afb*the tilt coefficient β)*(the door openness degree Odr of the door fully opened−the door openness degree Odr)]. The larger the front-back tilt angle Afb, the larger the above correction amount, whereas the larger the door openness degree Odr, the smaller the above correction amount.

Also, as shown in FIGS. 3C and 3D, in a case where a force that hinders the closed state of the door 14 is exerted in the closing operation of the door 14 due to a change in the attitude of the vehicle 11 (the door positioned downward at 17 degrees; the front side sinking at 17 degrees), a correction is made so that the target assisting power Ptg may be larger than in a case where the vehicle 11 has a horizontal attitude. This correction is made by increasing the amount of correction on the standard assisting power Psd compared to that in a case where the vehicle 11 has a horizontal attitude.

Specifically, the amount of correction made here on the standard assisting power Psd can be expressed as follows: [(the front-back tilt angle Afb*the tilt coefficient β)*the door openness degree Odr]. The larger the front-back tilt angle Afb and the larger the door openness degree Odr, the larger the above correction amount.

By contrast, in a case where a force that promotes the closed state of the door 14 is exerted in the closing operation of the door 14 due to a change in the attitude of the vehicle 11 (the door positioned upward at 17 degrees; the front side rising at 17 degrees), a correction is made so that the target assisting power Ptg may be smaller than in a case where the vehicle 11 has a horizontal attitude. This correction is made by decreasing the amount of correction on the standard assisting power Psd compared to that in a case where the vehicle 11 has a horizontal attitude.

Specifically, the amount of correction made here on the standard assisting power Psd can be expressed as follows: [(the front-back tilt angle Afb*the tilt coefficient β)*(the door openness degree Odr of the door fully opened−the door openness degree Odr)]. The larger the front-back tilt angle Afb, the larger the above correction amount, whereas the larger the door openness degree Odr, the smaller the above correction amount.

Such a configuration helps prevent a change in the attitude of the vehicle 11, if any, from affecting the operability for opening and closing the door 14 and also helps prevent the openness degree Odr of the door 14 at that time from affecting the operability for opening and closing the door 14. As a result, the operability for opening and closing the door 14 can be made to be favorable furthermore.

The controller 39 performs driving control for the door actuator 19 based on the target assisting power Ptg, which is the computation result obtained by the target assisting power computer 37. Favorable operability for opening and closing the door 14 is thus achieved with a simple apparatus configuration.

Also, the controller 39 performs driving control for the door actuator 19 is started only when the acceleration requirements are satisfied, the acceleration requirements being the opening and closing acceleration $\alpha dr\_y$ of the door 14 being above the predetermined opening and closing acceleration threshold $\alpha dr\_yth$ and the vehicle height acceleration $\alpha dr\_z$ of the door 14 being below the predetermined vehicle height acceleration threshold $\alpha dr\_zth$. Not starting driving of the door actuator 19 unless the acceleration requirements are satisfied can help prevent a situation where the operator may experience a strange feeling as if the door 14 is moving against their will.

Further, the controller 39 performs control so that the driving of the door actuator 19 stops once the opening and closing velocity Vdr of the door 14 falls below the predetermined velocity threshold Vdrth. Stopping the driving of the door actuator 19 once the opening and closing velocity Vdr of the door 14 falls below the predetermined velocity threshold Vdrth can help prevent a situation where the operator may experience a strange feeling as if the door 14 is coasting against their will.

[Operation of Door Opening and Closing Assisting Apparatus 10]

Figure 4A:
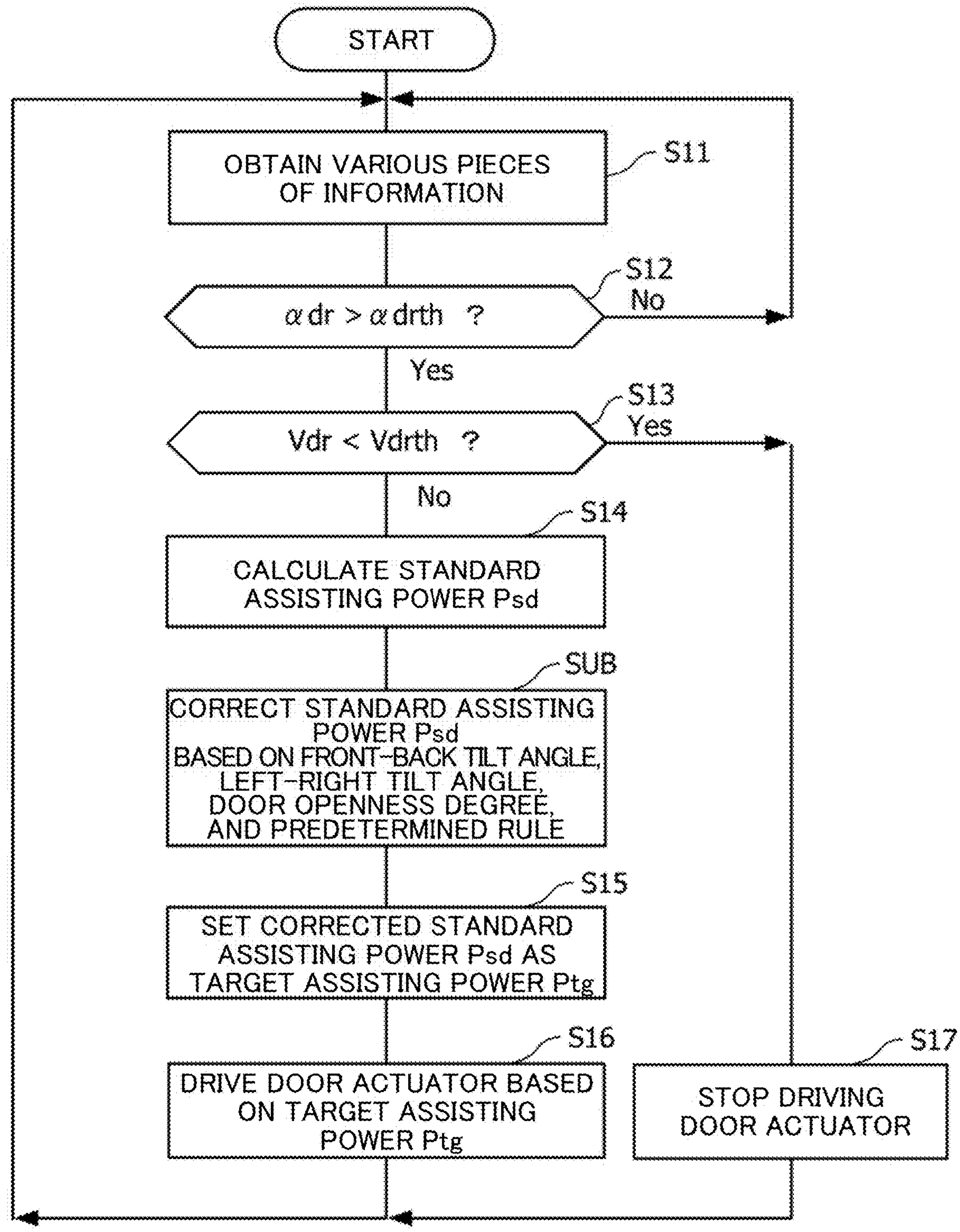
FIG. 4A is a flowchart used to describe the operation of the door opening and closing assisting apparatus according to the embodiment of the present invention.
Figure 4B:
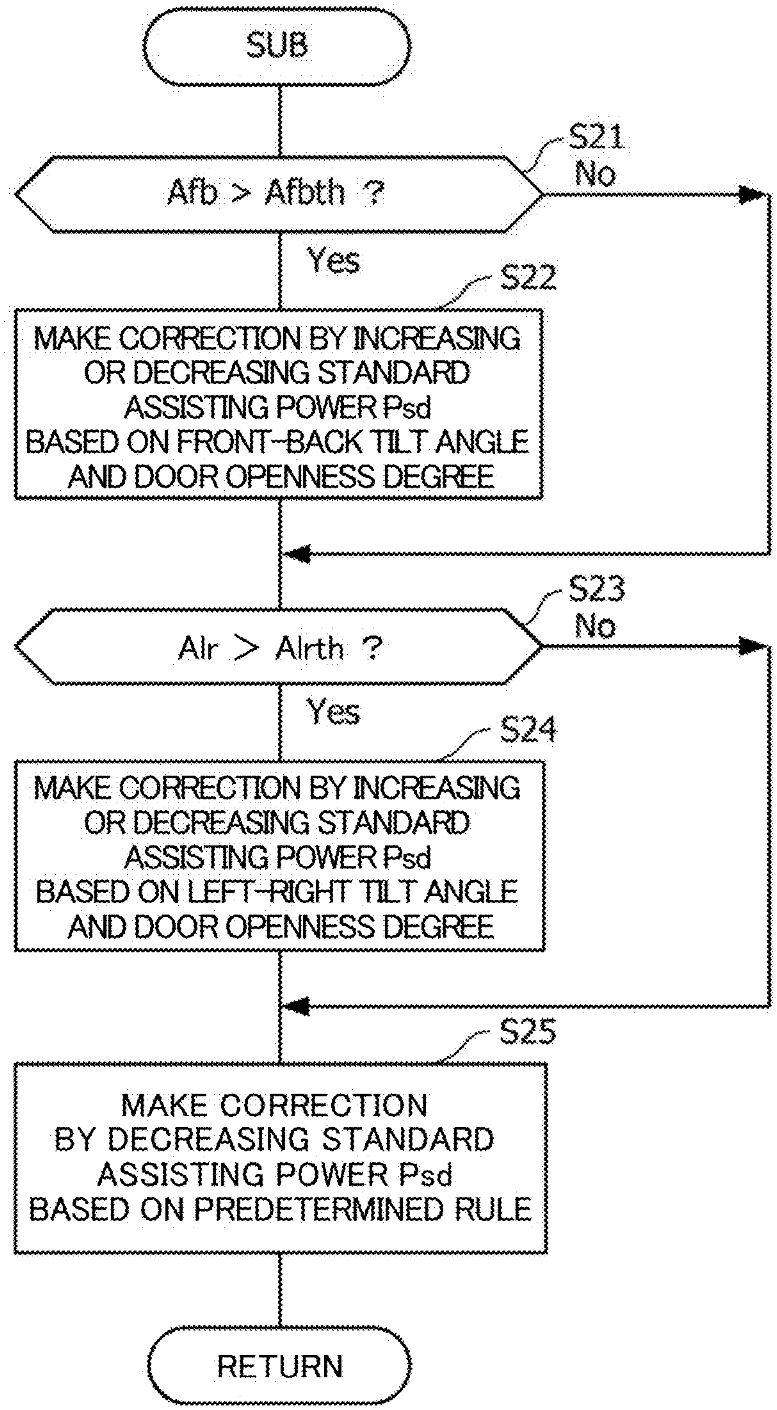
FIG. 4B is a flowchart illustrating a procedure for a segment of the operation of the door opening and closing assisting apparatus, the segment being correcting the standard assisting power into the target assisting power.
Figure 5:
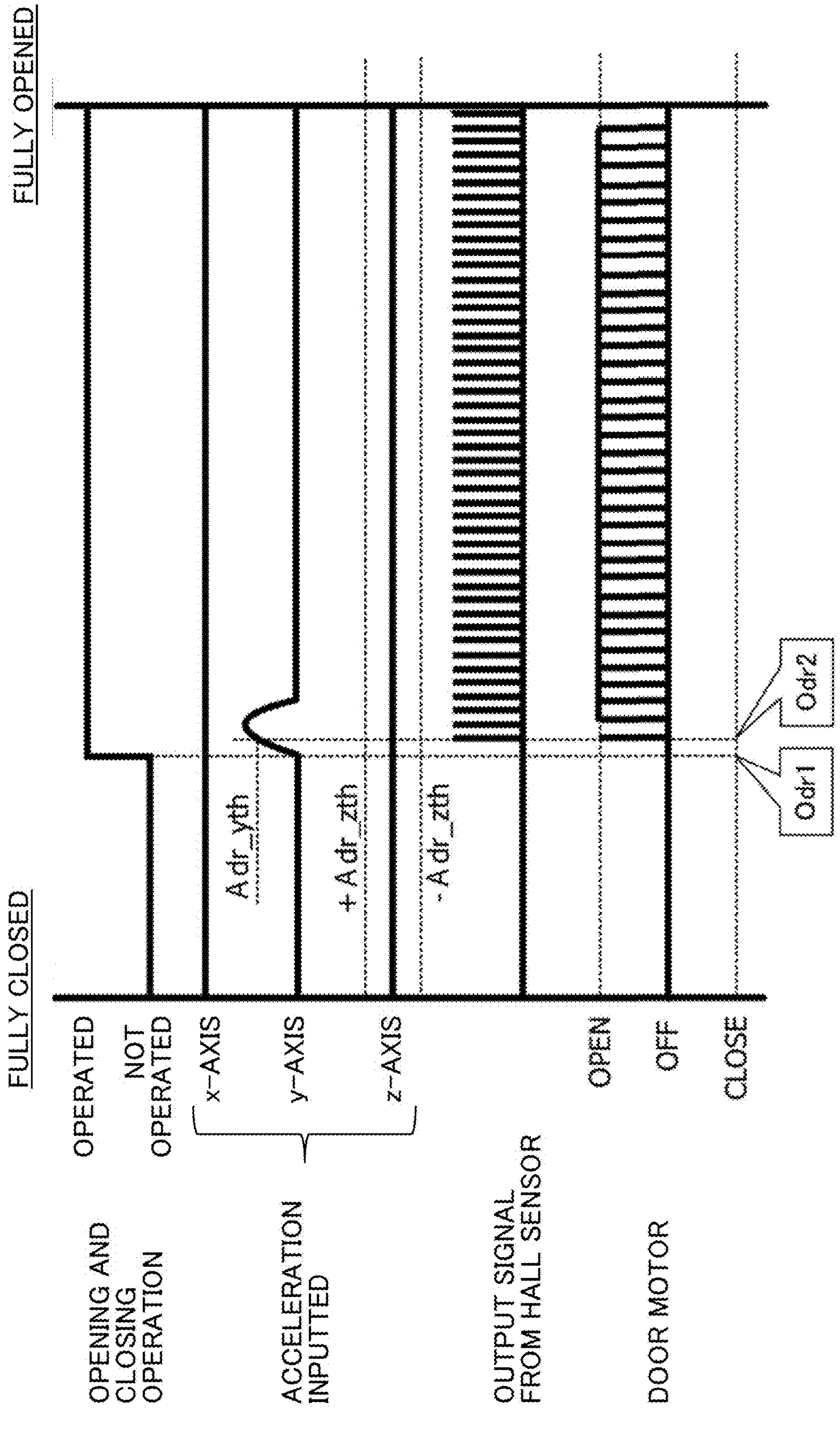
FIG. 5 is a diagram conceptually showing how driving control of the actuator is started at a timing at which the opening and closing acceleration is generated by a door opening and closing operation.

Next, the operation of the door opening and closing assisting apparatus 10 according to the embodiment of the present invention is described with reference to FIGS. 4A, 4B, and 5 as needed. FIG. 4A is a flowchart used to describe the operation of the door opening and closing assisting apparatus 10 according to the embodiment of the present invention. FIG. 4B is a flowchart illustrating a procedure for a segment of the operation of the door opening and closing assisting apparatus 10, the segment being correcting the standard assisting power Psd into the target assisting power Ptg. FIG. 5 is a diagram conceptually showing how driving control of the door actuator 19 is started at a timing at which the opening and closing acceleration $\alpha dr\_y$ is generated by an opening and closing operation of the door 14.

The following premises are made: the door 14 of the vehicle 11 is open and located at a door position Odr1, the door 14 is positioned upward (for example, the right door of the vehicle 11 that is tilted leftward), and the vehicle 11 has a front rising attitude (directed in the climbing direction on a slope). An operator starts an operation of opening the door 14 with the opening and closing velocity Vdr of the door 14 being equal to or above the predetermined velocity threshold Vdrth.

In Step S11 shown in FIG. 4A, the information obtainer 33 belonging to the door ECU 28 obtains chronological information on the opening and closing velocity Vdr and the openness degree Odr of the door 14 based on output signals from the Hall sensor 31 as well as chronological information on the front-back tilt angle Afb and the left-right tilt angle Alr and chronological information on the opening and closing acceleration $\alpha dr\_y$ and the vehicle height acceleration $\alpha dr\_z$ of the door 14 based on output signals from the acceleration sensor 32.

In Step S12, the determiner 35 belonging to the door ECU 28 determines whether the opening and closing acceleration $\alpha dr\_y$ of the door 14 is above a predetermined opening and closing acceleration threshold $\alpha dr\_yth$.

If it is determined in Step S12 that the opening and closing acceleration $\alpha dr\_y$ of the door 14 is not above the predetermined opening and closing acceleration threshold $\alpha dr\_yth$ (No in Step S12), the door ECU 28 returns to the start of the processing to repeat the subsequent processing sequentially.

Meanwhile, if it is determined in Step S12 that the opening and closing acceleration $\alpha dr\_y$ of the door 14 is above the predetermined opening and closing acceleration threshold $\alpha dr\_yth$ (Yes in Step S12), the door ECU 28 proceeds to the next Step S13.

In the example shown in FIG. 5, at a point where the door 14 reaches a door openness degree Odr2, the opening and closing acceleration $\alpha dr\_y$ of the door 14 is above the predetermined opening and closing acceleration threshold $\alpha dr\_yth$. Thus, the door ECU 28 proceeds to the next Step S13. Note that in the example shown in FIG. 5, at the point where the door 14 reaches the door openness degree Odr2, the vehicle height acceleration $\alpha dr\_z$ of the door 14 is also within a predetermined vehicle height acceleration threshold $|\alpha dz\_yth|$.

In Step S13, the determiner 35 belonging to the door ECU 28 determines whether the opening and closing velocity Vdr of the door 14 is below a predetermined velocity threshold Vdrth.

If it is determined in Step S13 that the opening and closing velocity Vdr of the door 14 is equal to or above the predetermined velocity threshold Vdrth, the door ECU 28 proceeds to the next Step S14.

Meanwhile, if it is determined in Step S13 that the opening and closing velocity Vdr of the door 14 is below the predetermined velocity threshold Vdrth, the door ECU 28 jumps to Step S17.

The example shown in FIG. 5 satisfies the prerequisite (the operation of opening the door 14 is started with the opening and closing velocity Vdr of the door 14 being equal to or above the predetermined velocity threshold Vdrth). Thus, the door ECU 28 proceeds to Step S14.

In Step S14, based on the opening and closing velocity Vdr of the door 14 obtained by the information obtainer 33, the standard assisting power calculator 41 of the target assisting power computer 37 belonging to the door ECU 28 calculates a standard assisting power Psd which is assisting power required to maintain the opening and closing velocity Vdr.

In a subroutine SUB, the corrector 43 of the target assisting power computer 37 belonging to the door ECU 28 corrects the standard assisting power Psd based on the front-back tilt angle Afb, the left-right tilt angle Alr, the door openness degree Odr, and a predetermined rule.

Now, the subroutine SUB is described with reference to FIG. 4B.

In Step S21 in the subroutine SUB shown in FIG. 4B, the determiner 35 belonging to the door ECU 28 determines whether the front-back tilt angle Afb of the vehicle 11 is above a predetermined front-back tilt angle threshold Afbth.

If it is determined in Step S21 that the front-back tilt angle Afb of the vehicle 11 is above the predetermined front-back tilt angle threshold Afbth (Yes in Step S21), the door ECU 28 proceeds to the next Step S22.

Meanwhile, if it is determined in Step S21 that the front-back tilt angle Afb of the vehicle 11 is not above the predetermined front-back tilt angle threshold Afbth (No in Step S21), the door ECU 28 jumps to Step S23.

In Step S22 of the subroutine SUB, the corrector 43 of the target assisting power computer 37 belonging to the door ECU 28 makes a correction by increasing or decreasing the standard assisting power Psd based on the front-back tilt angle Afb and the door openness degree Odr.

Considering the premises (the door 14 of the vehicle 11 is operated to be open, the door 14 is positioned upward, and the vehicle 11 has a front rising attitude), the corrector 43 makes the correction by increasing the standard assisting power Psd based on the front-back tilt angle Afb and the door openness degree Odr.

In Step S23 of the subroutine SUB, the determiner 35 belonging to the door ECU 28 determines whether the left-right tilt angle Alr of the vehicle 11 is above a predetermined left-right tilt angle threshold Alrth.

If it is determined in Step S23 that the left-right tilt angle Alr of the vehicle 11 is above the predetermined left-right tilt angle threshold Alrth (Yes in Step S23), the door ECU 28 proceeds to the next Step S24.

Meanwhile, if it is determined in Step S23 that the left-right tilt angle Alr of the vehicle 11 is not above the predetermined left-right tilt angle threshold Alrth (No in Step S23), the door ECU 28 jumps to Step S25.

In Step S24 of the subroutine SUB, the corrector 43 of the target assisting power computer 37 belonging to the door ECU 28 makes a correction by increasing or decreasing the standard assisting power Psd based on the left-right tilt angle Alr and the door openness degree Odr.

Considering the premises (the door 14 of the vehicle 11 is operated to be open, the door 14 is positioned upward, and the vehicle 11 has a front rising attitude), the corrector 43 makes the correction by increasing the standard assisting power Psd based on the left-right tilt angle Alr and the door openness degree Odr.

In Step S25 of the subroutine SUB, the corrector 43 of the target assisting power computer 37 belonging to the door ECU 28 makes a correction by decreasing the standard assisting power Psd based on a predetermined rule.

Then, the door ECU 28 returns to the main routine shown in FIG. 4A. The following continues the description of the main routine.

In Step S15 shown in FIG. 4A, the target assisting power computer 37 belonging to the door ECU 28 sets the standard assisting power Psd which has been corrected in the subroutine SUB, as the target assisting power Ptg. In the present embodiment, the target assisting power computer 37 sets the standard assisting power Psd corrected taking the above-described premises into account as the target assisting power Ptg.

In Step S16, the controller 39 belonging to the door ECU 28 performs driving control for the door actuator 19 based on the target assisting power Ptg, which is a computation result obtained by the target assisting power computer 37 (see the OPEN operation of the door motor and an output signal from the Hall sensor 31 at a door openness degree beyond the openness degree Odr2 shown in FIG. 5).

Consequently, favorable operability for opening and closing the door 14 can be achieved with a simple apparatus configuration.

After the processing in Step S16 ends, the door ECU 28 returns to Step S11 and repeats the subsequent processing.

When the opening and closing velocity Vdr of the door 14 falls below the predetermined velocity threshold Vdrth, in Step S17, the controller 39 belonging to the door ECU 28 performs control to stop driving of the door actuator 19.

Stopping driving of the door actuator 19 once the opening and closing velocity Vdr of the door 14 falls below the predetermined velocity threshold Vdrth can help prevent a situation where the operator may experience a strange feeling as if the door 14 is coasting against their will.

After the processing in Step S17 ends, the door ECU 28 returns to Step S11 and repeats the subsequent processing.

[Advantageous Effects by Door Opening and Closing Assisting Apparatus 10]

Next, advantageous effects offered by the door opening and closing assisting apparatus according to the embodiment of the present invention are described.

A door opening and closing assisting apparatus based on a first aspect is on the basis of the door opening and closing assisting apparatus 10 that assists an opening and closing operation of the door 14 on the vehicle 11.

The door opening and closing assisting apparatus 10 based on the first aspect includes the information obtainer 33 that obtains information on the opening and closing acceleration αdr_y of the door 14, the door actuator 19 that performs driving for assisting the opening and closing operation of the door 14, the target assisting power computer 37 that computes the target assisting power Ptg for assisting the opening and closing operation of the door 14, and the controller 39 that performs driving control for the door actuator 19 based on the target assisting power Ptg.

The controller 39 is configured to start the driving control for the door actuator 19 at a timing at which the information obtainer 33 obtains the opening and closing acceleration αdr_y of the door 14.

In the door opening and closing assisting apparatus 10 based on the first aspect, the controller 39 starts the driving control for the door actuator 19 at a timing at which the information obtainer 33 obtains the opening and closing acceleration αdr_y of the door 14. Thus, the door opening and closing assisting apparatus 10 can start the driving control for the door actuator 19 by detecting an operator's operation of opening and closing the door 14 promptly and precisely.

The door opening and closing assisting apparatus 10 based on the first aspect can start the driving control for the door actuator 19 by detecting an operator's operation of opening or closing the door 14 promptly and precisely. Also, in a case where the direction of the opening and closing operation of the door 14 is inverted, the driving control for the door actuator 19 can be started by detecting the timing of the inversion promptly and precisely through the opening and closing acceleration αdr_y of the door 14.

Thus, favorable operability that does not make the operator feel the weight of the door 14 when performing the opening and closing operation can be achieved with a simple apparatus configuration.

In addition, a door opening and closing assisting apparatus 10 based on a second aspect is the door opening and closing assisting apparatus 10 based on the first aspect, which may be configured as follows: the door is a swing door 14 that opens and closes, pivotally supported by the hinge mechanisms 13A and 13B provided on the vehicle body 20 of the vehicle 11, the door opening and closing assisting apparatus 10 further includes the acceleration sensor 32 that is provided on the door 14 and that detects the opening and closing acceleration αdr_y of the door 14 and the vehicle height acceleration αdr_z of the door 14 which is an acceleration in the vehicle height direction and the determiner 35 that determines the magnitudes of the opening and closing acceleration αdr_y and the vehicle height acceleration αdr_z of the door 14, the information obtainer 33 further obtains information on the vehicle height acceleration αdr_z of the door 14, and the controller 39 starts the driving control for the door actuator 19 at a timing at which the determiner 35 determines that the opening and closing acceleration αdr_y of the door 14 is above the predetermined opening and closing acceleration threshold αdr_yth and also the vehicle height acceleration αdr_z of the door 14 is below the predetermined vehicle height acceleration threshold αdr_zth.

Even when the opening and closing acceleration αdr_y of the door 14 is above the predetermined opening and closing acceleration threshold αdr_yth, if the vehicle height acceleration αdr_z of the door 14 is equal to or above the predetermined vehicle height acceleration threshold αdr_zth, it is probable that not an operator's opening and closing operation, but an external perturbation, such as shaking of the vehicle body 20 as a whole, has been detected. If the door actuator 19 is started to be driven in such a case, the operator may experience a strange feeling as if the door 14 is moving against their will.

Thus, in the door opening and closing assisting apparatus 10 based on the second aspect, the controller 39 starts the driving control for the door actuator 19 at a timing at which the determiner 35 determines that the opening and closing acceleration αdr_y of the door 14 is above the predetermined opening and closing acceleration threshold αdr_yth and also that the vehicle height acceleration αdr_z of the door 14 is below the predetermined vehicle height acceleration threshold αdr_zth.

This helps prevent a situation where the operator may experience a strange feeling as if the door 14 is moving against their will.

A value set as the predetermined vehicle height acceleration threshold αdr_zth may be any appropriate value (except for zero) indicating that the value of the opening and closing acceleration αdr_y of the door 14 is not a result of error detection.

According to the door opening and closing assisting apparatus 10 based on the second aspect, the controller 39 starts controlling driving of the door actuator 19 at a timing at which the determiner 35 determines that the opening and closing acceleration αdr_y of the door 14 is above the predetermined opening and closing acceleration threshold αdr_yth and also that the vehicle height acceleration αdr_z of the door 14 is below the predetermined vehicle height acceleration threshold αdr_zth. This can help prevent a situation where the operator may experience a strange feeling as if the door 14 is moving against their will.

Thus, as is similar to the door opening and closing assisting apparatus 10 based on the first aspect, favorable operability that does not make the operator feel the weight of the door 14 when performing the opening and closing operation can be achieved with a simple apparatus configuration.

Further, a door opening and closing assisting apparatus 10 based on a third aspect is the door opening and closing assisting apparatus 10 based on the first or second aspect, which may be configured as follows: the information obtainer 33 further obtains information on the opening and closing velocity Vdr of the door 14, and the target assisting power computer 37 calculates, based on the opening and closing velocity Vdr of the door 14 obtained by the information obtainer 33, the standard assisting power Psd which is assisting power required to maintain the opening and closing velocity Vdr, makes a correction by decreasing the calculated standard assisting power Psd according to a predetermined rule, and sets the standard assisting power Psd thus corrected by being decreased, as the target assisting power Ptg.

In the door opening and closing assisting apparatus 10 based on the third aspect, the target assisting power computer 37 calculates, based on the opening and closing velocity Vdr of the door 14 obtained by the information obtainer 33, the standard assisting power Psd which is assisting power required to maintain the opening and closing velocity Vdr, makes a correction by decreasing the calculated standard assisting power Psd according to a predetermined rule, and sets the standard assisting power Psd thus corrected by being decreased as the target assisting power Ptg. An occupant, when performing an operation of opening and closing the door 14, can actually feel, with a certain response, that the door 14 is opened and closed in accordance with their will because of the assisting power having a moderate magnitude as a result of a decrease correction.

In the door opening and closing assisting apparatus 10 based on the third aspect, the standard assisting power Psd is calculated based on the opening and closing velocity Vdr of the door 14, a correction is made by decreasing the calculated standard assisting power Psd according to a predetermined rule, and the standard assisting power Psd thus decreased and corrected is set as the target assisting power Ptg. Accordingly, favorable operability that does not make the operator feel the weight of the door 14 when performing the opening and closing operation can be achieved with a simple apparatus configuration, as is similar to the door opening and closing assisting apparatus 10 based on the first or second aspect.

Also, a door opening and closing assisting apparatus 10 based on a fourth aspect is the door opening and closing assisting apparatus 10 based on the third aspect, which may be configured as follows: the door is a swing door 14 that opens and closes, pivotally supported by the hinge mechanisms 13A and 13B provided on the vehicle body 20 of the vehicle 11, the door opening and closing assisting apparatus 10 further includes the acceleration sensor 32 that is provided on the door 14 to detect accelerations in three-dimensional directions including the vehicle length direction, the vehicle width direction, and the vehicle height direction, the information obtainer 33 further obtains, based on the accelerations in the three-dimensional directions detected by the acceleration sensor 32, information on the attitude of the vehicle 11 including front-back and left-right tilts, and the target assisting power computer 37 pre-stores information on the attitude of the vehicle 11 when the door 14 is fully closed, and when the door 14 is open, makes a correction to make the target assisting power Ptg larger or smaller based on the pre-stored attitude of the vehicle 11.

In a case where the acceleration sensor 32 is provided on the door 14 and information on the attitude of the vehicle 11 is obtained based on information detected by the acceleration sensor 32, the attitude of the vehicle 11 may have error depending on the open or close position of the door 14.

In this regard, the door opening and closing assisting apparatus 10 based on the fourth aspect pre-stores information on the attitude of the vehicle 11 when the door 14 is fully closed, and when the door 14 is open, makes a correction to make the target assisting power Ptg larger or smaller based on the pre-stored attitude of the vehicle 11. Thus, information on the attitude of the vehicle 11 can be obtained with high precision irrespective of the open/close position of the door 14.

Also, because the target assisting power computer 37 makes a correction to make the target assisting power Ptg larger or smaller based on the precise attitude of the vehicle 11, even if the attitude of the vehicle 11 changes, the affect that this attitude change has on the operability for opening and closing the door 14 can be reduced properly.

Also, a door opening and closing assisting apparatus 10 based on a fifth aspect is the door opening and closing assisting apparatus 10 based on the fourth aspect, which may be configured as follows: the door opening and closing assisting apparatus 10 further includes the Hall sensor (openness degree sensor) 31 provided on the door actuator 19 to detect the openness degree Odr of the door 14, the information obtainer 33 further obtains information on the openness degree Odr of the door 14 via the Hall sensor (openness degree sensor) 31, and the target assisting power computer 37 makes a correction to make the target assisting power Ptg larger or smaller based on the attitude of the vehicle 11 and the openness degree Odr of the door 14.

According to the door opening and closing assisting apparatus 10 based on the fifth aspect in which the target assisting power computer 37 makes a correction by increasing or decreasing the standard assisting power Psd based on the attitude of the vehicle 11 and the openness degree Odr of the door 14. Thus, even if the attitude of the vehicle 11 changes, the affect that this attitude change has on the operability for opening and closing the door 14 can be reduced properly, and also, the affect that the openness degree Odr of the door 14 at that time has on the operability for opening or closing the door 14 can be reduced.

As a result, operability for opening and closing the door 14 can be made to be even more favorable.

OTHER EMBODIMENTS

A plurality of embodiments described above show examples of how the present invention is embodied. Thus, those embodiments should not be interpreted as limiting the technical scope of the present invention. The present invention can be carried out in various modes without departing from the gist thereof or main features thereof.

What is claimed is:

1. A door opening and closing assisting apparatus that assists an opening and closing operation of a swing door pivotally supported by a hinge mechanism provided on a vehicle, the door opening and closing assisting apparatus comprising:

an acceleration sensor provided on the swing door to detect an opening and closing acceleration of the swing door and a vehicle height acceleration of the swing door which is an acceleration in a vehicle height direction;

a door actuator that performs driving for assisting the opening and closing operation of the swing door; and an ECU (electronic control unit) configured to function as:

an information obtainer that obtains information on the opening and closing acceleration and the vehicle height acceleration of the swing door;

a determiner that determines magnitudes of the opening and closing acceleration and the vehicle height acceleration of the swing door;

a target assisting power computer that computes a target assisting power for assisting the opening and closing operation of the swing door; and a controller that performs driving control for the door actuator based on the target assisting power, wherein the controller starts the driving control for the door actuator at a timing at which the information obtainer obtains the opening and closing acceleration and the vehicle height acceleration of the swing door and at a timing at which the determiner determines the opening and closing acceleration of the swing door is above a predetermined opening and closing acceleration threshold and the vehicle height acceleration of the swing door is below a predetermined vehicle height acceleration threshold.

2. The door opening and closing assisting apparatus according to claim 1, wherein the information obtainer further obtains information on an opening and closing velocity of the swing door, and the target assisting power computer calculates, based on the opening and closing velocity of the swing door obtained by the information obtainer, a standard assisting power which is an assisting power required to maintain the opening and closing velocity, makes a correction by decreasing the calculated standard assisting power according to a predetermined rule, and sets the standard assisting power thus corrected by being decreased, as the target assisting power.

3. The door opening and closing assisting apparatus according to claim 2, wherein the acceleration sensor detects accelerations in three-dimensional directions including a vehicle length direction, a vehicle width direction, and the vehicle height direction, the information obtainer further obtains, based on the accelerations in the three-dimensional directions detected by the acceleration sensor, information on an attitude of the vehicle including front-back and left-right tilts, and the target assisting power computer pre-stores information on the attitude of the vehicle when the swing door is fully closed, and when the swing door is open, makes a correction to make the target assisting power larger or smaller based on the pre-stored attitude of the vehicle.

4. The door opening and closing assisting apparatus according to claim 3, further comprising an openness degree sensor provided on the door actuator to detect a degree of openness of the swing door, wherein the information obtainer further obtains information on the degree of openness of the swing door through the openness degree sensor, and the target assisting power computer makes a correction to make the target assisting power larger or smaller based on the attitude of the vehicle and the degree of openness of the swing door.

* * * * *